(12) United States Patent
Kuramoto

(10) Patent No.: US 8,731,396 B2
(45) Date of Patent: May 20, 2014

(54) CAMERA SYSTEM

(76) Inventor: Yoshisuke Kuramoto, Tokyo (JP)

( * ) Notice: Subject to any disclaimer, the term of this patent is extended or adjusted under 35 U.S.C. 154(b) by 0 days.

(21) Appl. No.: 13/590,642

(22) Filed: Aug. 21, 2012

(65) Prior Publication Data

US 2013/0183029 A1    Jul. 18, 2013

(30) Foreign Application Priority Data

Jan. 17, 2012  (JP) .................................. 2012-000492

(51) Int. Cl.
*G03B 17/48* (2006.01)
*G03B 29/00* (2006.01)
*G03B 19/18* (2006.01)
*H04N 1/23* (2006.01)

(52) U.S. Cl.
USPC ............. 396/429; 348/64; 352/131; 352/137; 358/302; 358/906; 358/909.1

(58) Field of Classification Search
USPC .................. 396/429; 352/244, 136, 137, 131; 348/64; 358/302, 305, 906, 909.1
See application file for complete search history.

(56) References Cited

U.S. PATENT DOCUMENTS

2006/0239586 A1* 10/2006 Mowry .......................... 382/278

* cited by examiner

*Primary Examiner* — Rochelle-Ann J Blackman
(74) *Attorney, Agent, or Firm* — Jackson Patent Law Office

(57) ABSTRACT

Disclosed is a system configured to operate with a hand-held camera. The hand-held camera is configured to operate with a film cartridge. The film cartridge defines an opening to enable entry of a driven film-feeding member into engagement with film edge perforations, the film-feeding member being driven by the camera for movement in a rectilinear path whereby successive film edge perforations are engaged so as to intermittently move the film past the exposure aperture. The system comprises a housing configured to be moveably engageable with the camera, in place of the film cartridge; a detector configured to generate a first signal in response to detecting a movement of the film-feeding member; and circuitry configured to write signals from an image sensor into the memory, according to an addressing mechanism that is responsive to the first signal.

20 Claims, 8 Drawing Sheets

CAMERA SYSTEM

BACKGROUND OF THE INVENTION

1. Field of the Invention

This invention relates movie cameras and, more particularly, to 8 mm film movie cameras.

2. Description of Related Art

Although 8 mm film movie cameras that once shipped more than 10,000,000 units are no longer in production, there are many enthusiastic fans who are much attracted to the mood and atmosphere of images taken with 8 mm movie cameras, and a number of functioning cameras still remain. However, film for these 8 mm movie cameras has become very difficult to obtain in recent years, and prices have soared.

SUMMARY OF THE INVENTION

To address the problem above, there is a system configured to operate with a hand-held camera. The hand-held camera is configured to operate with a film cartridge, the film cartridge comprising a housing having a front wall defining an exposure aperture across which a film can be intermittently moved for exposure, the housing being configured to rotatably support a coil of film so that the film can be guided past the exposure aperture, the front wall defining an opening to enable entry of a driven film-feeding member into engagement with film edge perforations, the film-feeding member being driven by the camera for movement in a rectilinear path whereby successive film edge perforations are engaged so as to intermittently move the film past the exposure aperture. The system comprises a housing configured to be moveably engageable with the camera, in place of the film cartridge; a detector configured to generate a first signal in response to detecting a movement of the film-feeding member; a memory in the housing; an electronic image sensor, in the housing, configured to generate a second signal; and circuitry configured to write the second signal into the memory, according to an addressing mechanism that is responsive to the first signal.

According to another aspect of the present invention, there is a method of operating with a hand-held camera. The hand-held camera is configured to operate with a film cartridge, the film cartridge comprising a housing having a front wall defining an exposure aperture across which a film can be intermittently moved for exposure, the housing being configured to rotatably support a coil of film so that the film can be guided past the exposure aperture, the front wall defining an opening to enable entry of a driven film-feeding member into engagement with film edge perforations, the film-feeding member being driven by the camera for movement in a rectilinear path whereby successive film edge perforations are engaged so as to intermittently move the film past the exposure aperture. The method comprises the steps, performed in a housing configured to be moveably engageable with the camera in place of the film cartridge, of detecting a movement of the film-feeding member; responsive to the detecting step, generating a first signal; receiving a light image; responsive to the receiving step, generating a second signal; and storing the second signal into a memory, according to an addressing mechanism that is responsive to the first signal.

According to yet another aspect of the present invention, there is a system for operating with a hand-held camera. The hand-held camera is configured to operate with a film cartridge, the film cartridge comprising a housing having a front wall defining an exposure aperture across which a film can be intermittently moved for exposure, the housing being configured to rotatably support a coil of film so that the film can be guided past the exposure aperture, the front wall defining an opening to enable entry of a driven film-feeding member into engagement with film edge perforations, the film-feeding member being driven by the camera for movement in a rectilinear path whereby successive film edge perforations are engaged so as to intermittently move the film past the exposure aperture. The system comprises means for detecting a movement of the film-feeding member; means for generating a first signal responsive to the detecting means; means for receiving a light image; means for generating a second signal responsive to the receiving light image; and means for storing the second signal into a memory, according to an addressing mechanism that is responsive to the first signal.

The accompanying drawings which are incorporated in and which constitute a part of this specification illustrate embodiments of the invention and, together with the description, explain the principles of the invention, and additional advantages thereof. Throughout the drawings, corresponding elements are labeled with corresponding reference numbers.

First Exemplary Embodiment

Figure 1:
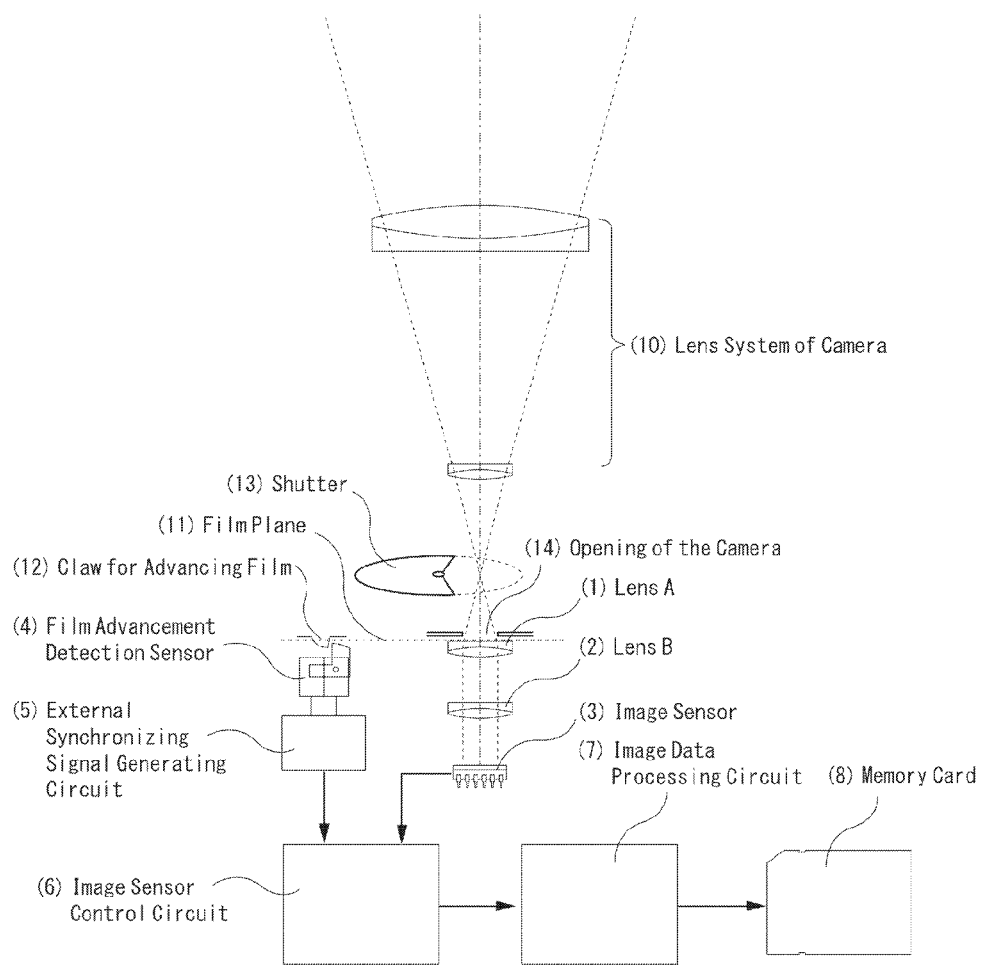
FIG. 1 is a diagram emphasizing signal paths between elements in an exemplary embodiment of the present invention.

FIG. 1 is a diagram emphasizing signal paths in an exemplary system. The exemplary system includes a lens A 1 closely attached to the opening of the camera 14. The lens A 1 extends the original position of the image location to the image sensor 3 and a lens B 2 which forms an image on the image sensor 3. A film advancement detection sensor 4 generates external synchronizing signals and external synchronizing signal generating circuit 5. An image sensor control circuit 6 generates movie data synchronized to the full opening of the shutter or advancement speed of film. An image data processing circuit 7 converts movie data generated from the image sensor control circuit 6 to a data format for recording to memory cards 8. A memory card 8 records the movie data of a shot image. Batteries 9 drive these circuits.

Images formed on the film plane 11 through the lens of the camera 10 are focused on the lens A 1. Relative to the housing of the exemplary device, the lens A 1 is positioned where the film would be relative the housing of a conventional Kodak super 8 cartridge. The A lens 1 refocuses the images on the image the sensor 3 using lens B 2.

The film advancement detection sensor 4 uses photo-couplers or infrared, etc., is used to detect motion of the claw for advancing film 12 and sends signals to the external synchronizing signal generating circuit 5. The claw for advancing film 12 hooks within the film's perforations to advance the film 11 in increments of 1 frame per 4.2 mm.

Figure 2:
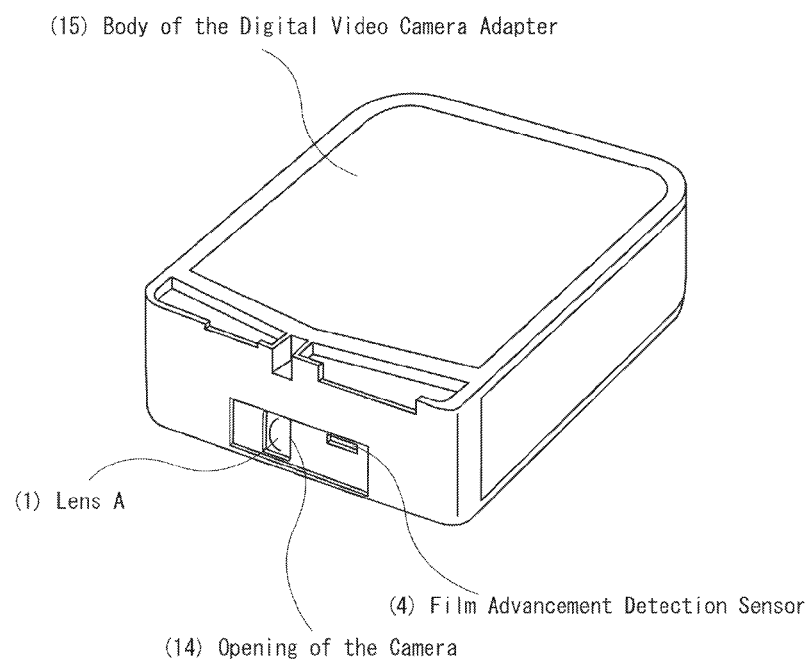
FIG. 2 is a perspective view of a housing of an exemplary device having a Kodak Super 8 form factor standard.

FIG. 2 is a perspective view of the housing of the first exemplary device.

Figure 3:
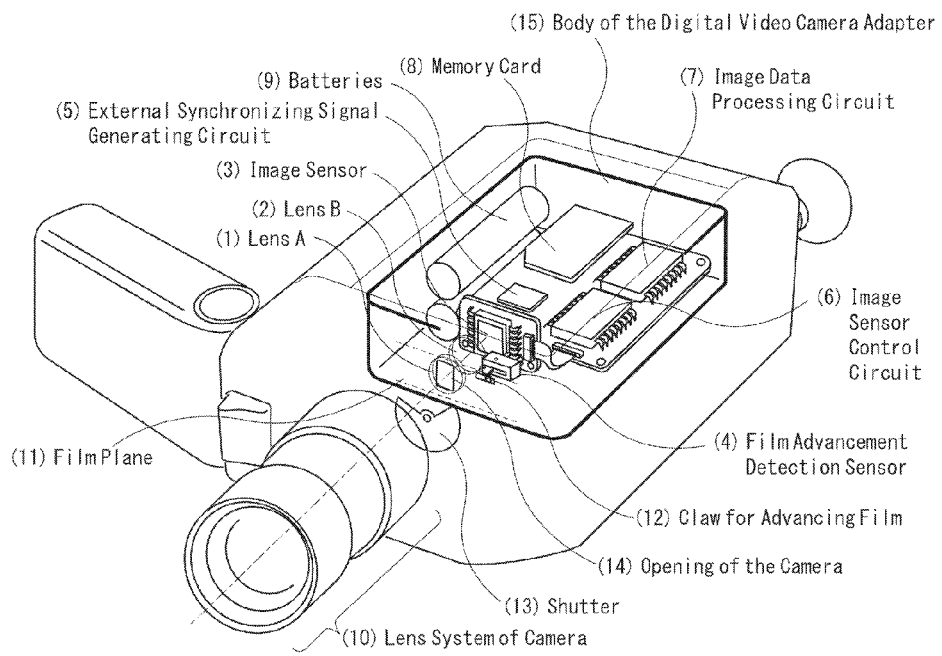
FIG. 3 is a perspective view of the exemplary device set in a conventional 8 mm movie camera that uses a film cartridge with Kodak Super 8 form factor standard.

FIG. 3 is a perspective view of the exemplary device set in a conventional 8 mm movie camera that uses a film cartridge having a Kodak Super 8 form factor.

Lens A 1, lens B 2, image sensor 3, film advancement detection sensor 4, external synchronizing signal generating circuit 5, image sensor control circuit 6, image data processing circuit 7, memory card 8, batteries 9, etc., are fitted in a body standardized to a Super 8 standard cassette. When the camera's shutter is released, it synchronizes to the full opening of the shutter or advancement speed of film and shoots the image, and saves that movie data to the memory card. Memory card 8 is removably connected to the remaining of the exemplary device, meaning that, without using tools, a user may connect or remove memory card 8 from the remaining of the exemplary device.

Lens A 1 closely attached to the opening of the camera 14 which extends the original position of the image location to the image sensor 3 and lens B 2 which forms an image on the image sensor 3, image sensor 3, film advancement detection sensor 4 which generates external synchronizing signals and external synchronizing signal generating circuit 5, image sensor control circuit 6 which generates movie data synchronized to the full opening of the shutter or advancement speed of film, image data processing circuit 7 which converts movie data generated from the image sensor control circuit 6 to a data format for recording to memory cards 8, memory card 8 which records the movie data of a shot image, and batteries 9 that drive these circuits, are fitted in a body standardized to a standard film cartridge of an 8 mm movie camera, and set into the film compartment of 8 mm movie cameras, and synchronizes to the full opening of the shutter or advancement speed of film and shoots the image, and saves that movie data to a memory card 8.

Figure 4:
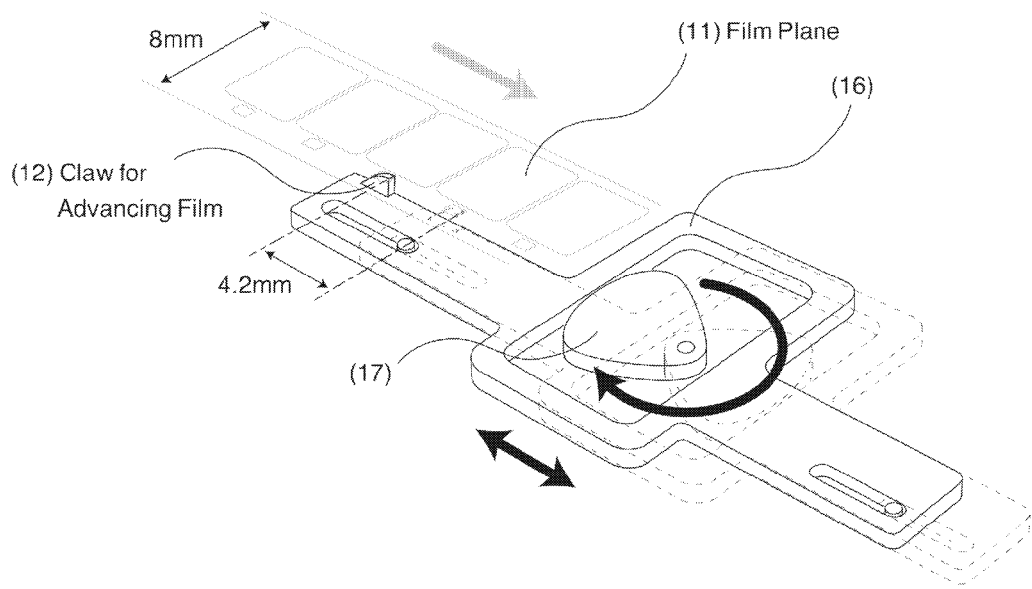
FIG. 4 is a diagram showing a film advancement mechanism in the conventional 8 mm camera.

FIG. 4 is an example of a film advancement mechanism where the plate 16 with a claw for advancing film 12 is moved back and forth in the direction of the film's advancement by rotating a cam 17. Generally, the shutter of 8 mm movie cameras functions by rotating the circular disk with a cutout synchronously with the advancement speed of film, and the shutter opens each time the film advances one frame and the cutout of the circular disk pass by once. Advancement of the film takes place when the shutter is closed, claw engages the film perforations and advances the film to the next frame.

Figure 5:
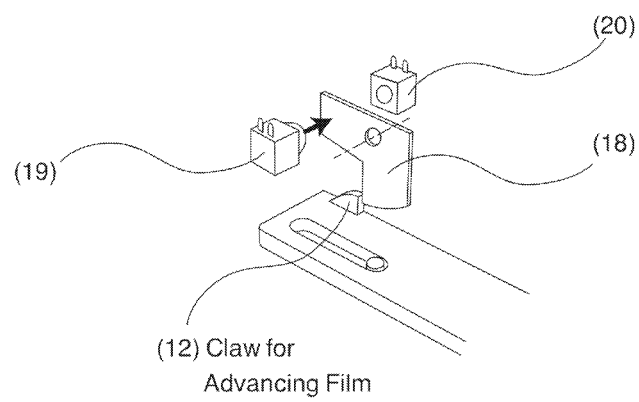
FIG. 5 is a diagram showing a frame detector according to an exemplary embodiment of the present invention.
Figure 6:
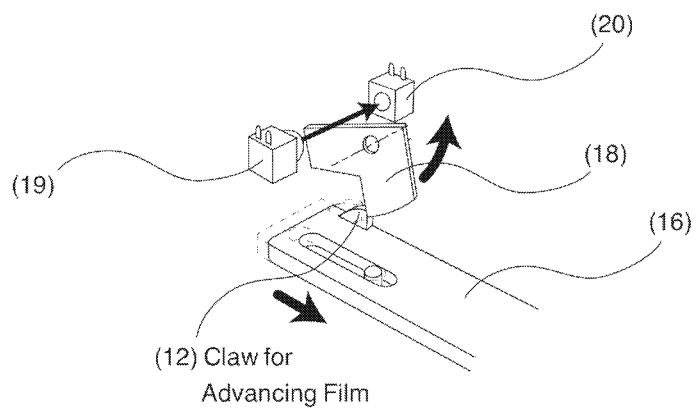
FIG. 6 is a diagram showing the frame detector at a subsequent point in time.

Film advancement detection sensor 4 is, for example in FIG. 5, composed of a light source 19 and light receiver 20 with a light-shield plate 18 placed in-between, and when the claw for advancing film 12 is moved in the direction of the advancement of film, it hooks the light-shield plate 18 and misaligns it from in-between the light source 19 and light receiver 20 to create electrical signals FIG. 6. This electrical signal is synchronized to the advancement speed of film, and from these signals, the external synchronizing signal generating circuit 5 sends external synchronizing signals to the image sensor control circuit 6, and takes in the images from the image sensor to the image sensor control circuit 6.

Images taken in from the image sensor 3 are generated as movie data synchronized to the full opening of the shutter or advancement speed of film and sent from the image sensor control circuit 6 to the image date processing circuit 7. Movie data sent from the image sensor control circuit 6 is converted into a memory medium recordable format in the image data processing unit 7, and it is recorded on a memory card 8. Image sensor control circuits 6 and image data processing circuits 7 are available in set form with an image sensor 3 as products in the market.

More specifically, image sensor 3 may be an interline transfer type charge coupled device (CCD), in which, lines of storage cells are interdigitated amongst the active lines in the optical image area. Such lines of storage cells are only one clock pulse away from their individual corresponding active imaging lines, and each storage cell line is protected by a mask that keeps the storage cell in the dark. So the active lines are simply clocked to their neighboring storage lines at the array's frame rate, e.g., during each vertical retrace period. Sync signal generator circuit 5 sends a clock signal to sensor 3, to clock out all lines from the interdigitated storage cells, before the next vertical retrace.

From electrical signals output from the film advancement detection sensor 4, the synch signal generator circuit 5 calculates the moment the camera shutter 13 fully opens, and sends external synchronizing signals to the image sensor control circuit 6, and takes in the images from the image sensor to the image sensor control circuit 6.

The moment (or timing) that the shutter 13 fully opens, is between the advancement of film and the next advancement of film. The claw for advancing film 12 and the shutter 13 are parts of the 8 mm camera mechanism, and because it is mechanically connected, the movement of the claw for advancing film 12 and the moment that the shutter 13 fully opens are examined using an actual 8 mm camera. And from the electrical signals output from the film advancement detection sensor 4, external synchronizing signals are created from the synch signal generator 5 to match the movement of the claw and the moment the shutter 13 fully opens.

For example, electrical signals output from the film advancement detection sensor 4 are pulse signals with regular intervals, so the pulses are divided inbetween and external synchronizing signals are output when the shutter 13 is in a fully open position, using the external synchronizing signal generating circuit 5.

Figure 7:
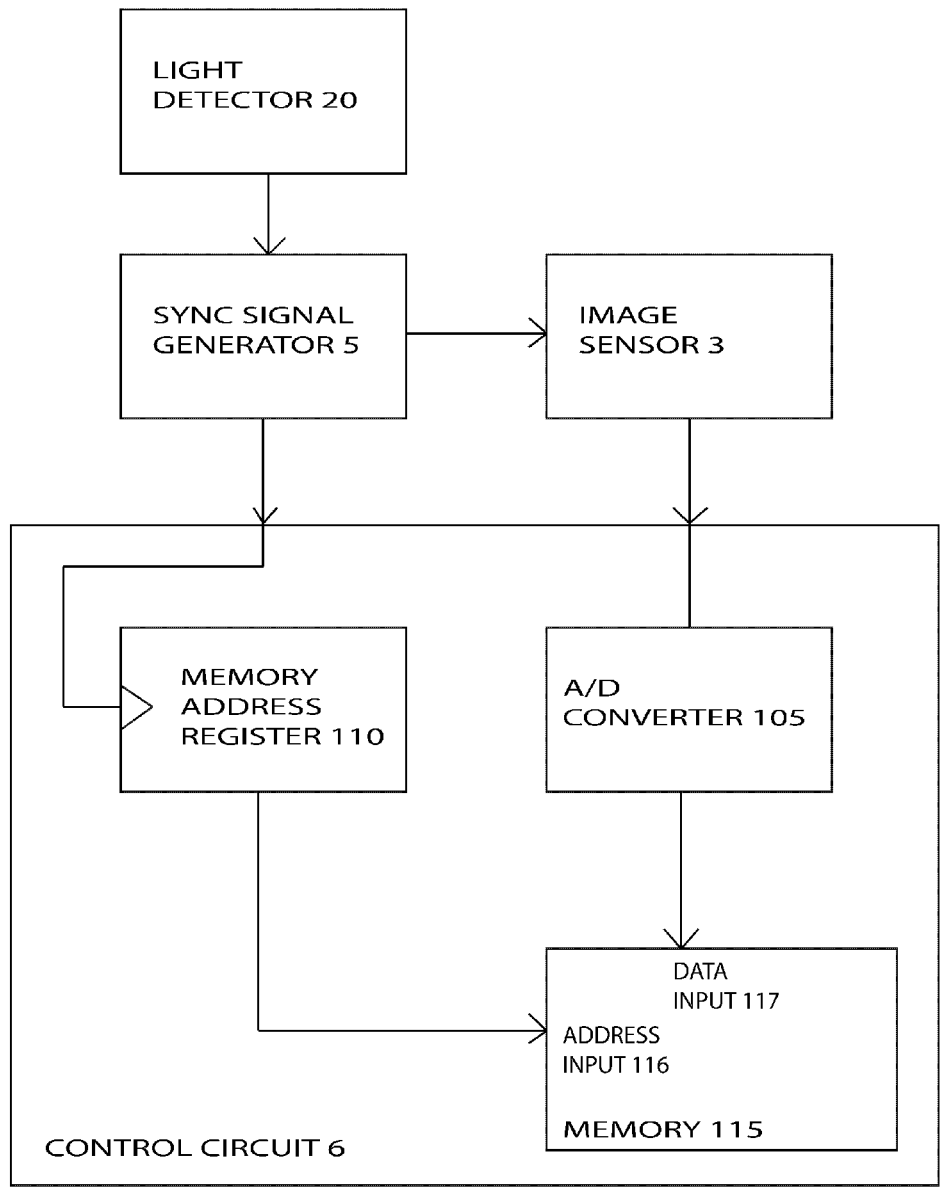
FIG. 7 is a block diagram showing an addressing scheme in accordance with an exemplary embodiment of the present invention.

FIG. 7 shows a possible exemplary implementation of control circuit 6. As shown in FIG. 7, sync signal generator 5 generates clock signals to increment memory address register 110. Memory address register 110 generates signals to address memory 115. A data input 117 of memory 115 is downstream from a video signal output of image sensor 3.

Sync signal generator 5 receives a signal from light detector 20 of advancement sensor 20. A high input on the signal from detector 20 inhibits the generation of clock signals for the memory address register 110. Thus, the video image signals from the image sensor 3 are not written into memory 110 at a time when shutter blocks light images directed toward image sensor 3.

Figure 8:
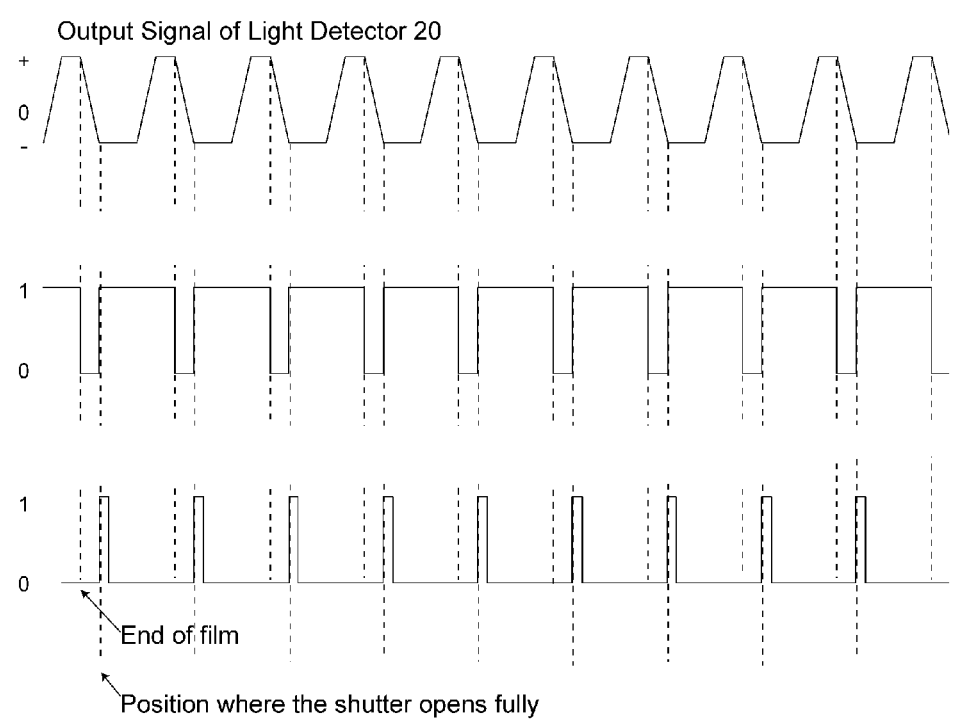
FIG. 8 is a timing diagram for further explaining operation of the circuitry, by showing a relation between signals on some signal lines shown in FIG. 7.

FIG. 8 is a timing diagram generating example of the external synchronizing signal. (When the shutter opens fully at intervals of ⅕ of the film's advancement after the film is advanced 1 frame using the claw for advancing film). The first row shows an output signal of light detector 20. Generator 5, shown in FIG. 7, generates the signal shown in the second row by detecting the falling edge of the output signal of the light detector 20, to create block pulses that are ⅕ with the interval of the wave. Generator 5 generates the third round by detecting the rising edge of the waveform of the second row. Signal generator 5 generates the external synchronizing signal shown in the third row in accordance with specifications of the image sensor 3, or according to specifications of a retail camera control chip.

Second Exemplary Embodiment

In accordance with a second exemplary embodiment, image sensor 3 is a full-frame type CCD, having the advantage of nearly 100-percent of its surface being photosensitive, with virtually no dead space between pixels. The imaging surface is protected from incident light, during readout of the CCD, by shutter 13. Charge accumulated when the shutter 13 open is subsequently transferred and read out after the shutter 13 is closed.

SUMMARY

The exemplary digital video adapters that are set inside 8 mm movie cameras, replacing its film cassettes, and transfer movie data to storage medium such as memory cards for storage. The body of the digital video adapter is the same standard as the film cassette of the 8 mm movie camera, thereby avoiding any need to alter the 8 mm movie camera.

An image memory address is incremented, and clock signals to the image sensor 3 generated, when the film would be paused and the shutter fully open.

In other words, in a conventional Kodak Super 8 film cassette cartridge, there is an opening provided in a cartridge edge wall to permit entry of a driven film-feeding member, such as the camera claw 12, into engagement with film edge perforations. The claw 12 may be positively driven by the camera for movement in a known manner in a rectilinear path whereby successive film perforations are engaged so as to intermittently move film past an opening for presentation to an exposure aperture in the camera. In contrast, in applicant's exemplary devices there is an opening provided in a cartridge edge wall to permit entry of a driven film-feeding member, such as the camera claw 12, into engagement with film advancement detection sensor 4. The claw 12 may be positively driven by the camera for movement in a known manner in a rectilinear path to cause detection sensor 4 to generate a signal received by sync signal generator 5. Sync signal generator 5 generates a synchronization signal for control circuitry 6 and/or for CCD 3. CCD 3 is aligned with an exposure aperture in the camera.

Although movie data synchronized to the full opening of the shutter of an 8 mm movie camera or advancement speed of film is different from the movie data of television units, etc., and frame rates, etc., viewing movies on a personal computer or editing using movie editing software is not a problem. If it is necessary to convert the frame rate, it can be easily done using movie editing software on a personal computer.

LIST OF REFERENCE NUMBERS 1 lens A
2 lens B
3 image sensor
4 film advancement detection sensor
5 external synchronizing signal generating circuit
6 image sensor control circuit
7 image data processing circuit
8 memory card
9 batteries
10 lens system of camera
11 film plane
12 claw for advancing film
13 shutter
14 opening of the camera
15 body of the digital video camera adapter
16 plate
17 cam
18 light-shield plate
19 light source
20 light detector
105 analog to digital (A/D) convertor
110 memory address register
115 memory
116 address input of memory
117 data input of memory Throughout this Patent Application, certain processing may be depicted in serial, parallel, or other fashion, for ease of description. Actual hardware and software realizations, however, may be varied depending on desired optimizations apparent to one of ordinary skill in the art.

In this Patent Application, the word circuitry encompasses dedicated hardware, and/or programmable hardware, such as a central processing unit CPU or reconfigurable logic array, in combination with programming data, such as sequentially fetched CPU instructions or programming data for a reconfigurable array. Thus, circuitry encompasses, for example, a general-purpose electronic processor programmed with software, acting to carry out a described function.

Benefits, other advantages, and solutions to problems have been described above with regard to specific examples. The benefits, advantages, solutions to problems, and any elements that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. For example, image sensor 3, image sensor control circuit 6, and image data processing circuit 7 may be in a conventional retail video camera unit, which can be controlled with external synchronizing signals generated as described above. For example, if this device is equipped with a microphone input and a monitor output to transfer data outside of the camera, a microphone can be connected to shoot movies with sound, an external monitor can be connected to check the image while shooting movies, and menus can be displayed to make various settings of this device, etc.

Accordingly, departures may be made from such details without departing from the spirit or the scope of Applicants' general inventive concept. The invention is defined in the following claims. In general, the words "first," "second," etc., employed in the claims do not necessarily denote an order.

The invention claimed is:

1. A system configured to operate with a hand-held camera, the hand-held camera being configured to operate with a film cartridge, the film cartridge comprising a housing having a front wall defining an exposure aperture across which a film can be intermittently moved for exposure, the housing being configured to rotatably support a coil of film so that the film can be guided past the exposure aperture, the front wall defining an opening to enable entry of a film-feeding member into engagement with film edge perforations, the film-feeding member being driven by the camera for movement in a rectilinear path whereby successive film edge perforations are engaged so as to intermittently move the film past the exposure aperture, the system comprising:
 a housing configured to be moveably engageable with the camera, in place of the film cartridge;
 a detector configured to generate a first signal in response to detecting a movement of the film-feeding member;

a memory in the housing, the memory including an address input;

an electronic image sensor, in the housing, configured to generate a second signal; and circuitry configured to write the second signal into the memory, by generating a third signal in response to the first signal, and applying the third signal to the address input of the memory.

2. A system according to claim 1 wherein the circuitry configured to write includes circuitry configured to store an address for accessing the memory, and to increment the address responsive to the first signal.

3. A system according to claim 1 wherein a focal plane shutter is located at the film plane while an iris shutter is located within the lens.

4. A system according to claim 1 wherein the there is no film between the imaged object in the image sensor.

5. A system according to claim 1 wherein the camera includes a shutter.

6. A system according to claim 5 wherein a movement of the shutter is synchronized with a movement of the film-feeding member.

7. A system according to claim 1 wherein the system sends no signal to the camera.

8. A system according to claim 1 wherein the system sends no control signal to the camera.

9. A system according to claim 1 wherein the camera has a power supply configured to power a movement of the film-feeding member, and wherein the system has a battery power system independent of the power supply of the camera.

10. A system according to claim 1 wherein the detector includes a light source;

a light detector; and a light-shield configured to be moved, by the film-feeding member, from a position on a line between the light source and the light detector, to a position off the line between the light source and the light detector.

11. A system according to claim 1 further including a charge coupled device responsive to the first signal.

12. A system according to claim 1 wherein the first signal conditionally inhibits generation of clock signals depending on a level of the first signal.

13. A method of operating with a hand-held camera, the hand-held camera being configured to operate with a film cartridge, the film cartridge comprising a housing having a front wall defining an exposure aperture across which a film can be intermittently moved for exposure, the housing being configured to rotatably support a coil of film so that the film can be guided past the exposure aperture, the front wall defining an opening to enable entry of a driven film-feeding member into engagement with film edge perforations, the film-feeding member being driven by the camera for movement in a rectilinear path whereby successive film edge perforations are engaged so as to intermittently move the film past the exposure aperture, the method comprising the following steps, performed in a housing configured to be moveably engageable with the camera in place of the film cartridge:

detecting a movement of the film-feeding member;

responsive to the detecting step, generating a first signal;

receiving a light image;

responsive to the receiving step, generating a second signal; and storing the second signal into a memory, by generating a third signal in response to the first signal and applying the third signal to an address input of the memory.

14. A method according to claim 13 wherein detecting includes moving a light-shield, using the film-feeding member, from a position on a line between a light source and a light detector, to a position off the line between the light source and the light detector.

15. A method according to claim 13 further including the step of applying the first signal to the charge coupled device.

16. A method according to claim 13 wherein the step of conditionally inhibiting generation of clock signals depending on a level of the first signal.

17. A system for operating with a hand-held camera, the hand-held camera being configured to operate with a film cartridge, the film cartridge comprising a housing having a front wall defining an exposure aperture across which a film can be intermittently moved for exposure, the housing being configured to rotatably support a coil of film so that the film can be guided past the exposure aperture, the front wall defining an opening to enable entry of a driven film-feeding member into engagement with film edge perforations, the film-feeding member being driven by the camera for movement in a rectilinear path whereby successive film edge perforations are engaged so as to intermittently move the film past the exposure aperture, the system comprising:

means for detecting a movement of the film-feeding member;

means for generating a first signal responsive to the detecting means;

means for receiving a light image;

means for generating a second signal responsive to the means for receiving a light image; and means for storing the second signal into a memory, by generating a third signal in response to the first signal, and applying the third signal to an address input of the memory.

18. A system according to claim 17 wherein the means for detecting includes a light source;

a light detector; and a light-shield configured to be moved, by the film-feeding member, from a position on a line between the light source and the light detector, to a position off the line between the light source and the light detector.

19. A system according to claim 17 further including a charge coupled device responsive to the first signal.

20. A system according to claim 17 wherein the first signal conditionally inhibits generation of clock signals depending on a level of the first signal.

* * * * *